United States Patent
Jackeschky

[11] Patent Number: 5,948,463
[45] Date of Patent: Sep. 7, 1999

[54] METHOD OF MANUFACTURING A DIETETIC, CHOLESTEROL-REDUCED WHOLE EGG OR EGG YOLK PRODUCT

[76] Inventor: Hans-Joachim Jackeschky, Redder 2-4, 22929 Hammoor, Germany

[21] Appl. No.: 08/913,562
[22] PCT Filed: Mar. 20, 1996
[86] PCT No.: PCT/EP96/01192
  § 371 Date: Sep. 15, 1997
  § 102(e) Date: Sep. 15, 1997
[87] PCT Pub. No.: WO96/29892
  PCT Pub. Date: Oct. 3, 1996

[30] Foreign Application Priority Data

Mar. 31, 1995 [DE] Germany .......................... 195 11 944

[51] Int. Cl.[6] .................................. A23L 1/32; A23L 1/28
[52] U.S. Cl. ........................................ 426/614; 426/429
[58] Field of Search .................................. 426/614, 429

[56] References Cited

U.S. PATENT DOCUMENTS 5,468,511  11/1995  Zeidler ..................................... 426/614

FOREIGN PATENT DOCUMENTS 2270925    3/1994  United Kingdom .
WO 93/14649  8/1993  WIPO .
WO 93/16607  9/1993  WIPO .

OTHER PUBLICATIONS

Yurtov et al.; Database WPI/DERWENT; Week 9128; GB, AN 91–206193 & SU, A, 1,587,452; Aug. 23, 1990.

*Primary Examiner*—Anthony J. Weier
*Attorney, Agent, or Firm*—Samuels, Gauthier & Stevens

[57] ABSTRACT

Described is a method of manufacturing a dietary cholesterol-reduced whole-egg or egg-yolk product, the method calling for the whole-egg or egg-yolk used as the starting material to be dried and the lipid fraction removed from the dried whole-egg or egg-yolk by treatment with a low-cholesterol liquid agent based on a lipid suitable for human consumption, the lipid fraction removed being at least partly replaced by the treatment agent. The method is characterized in that the treatment agent is pressed through the whole-egg or egg-yolk at a given temperature and pressure.

7 Claims, 1 Drawing Sheet

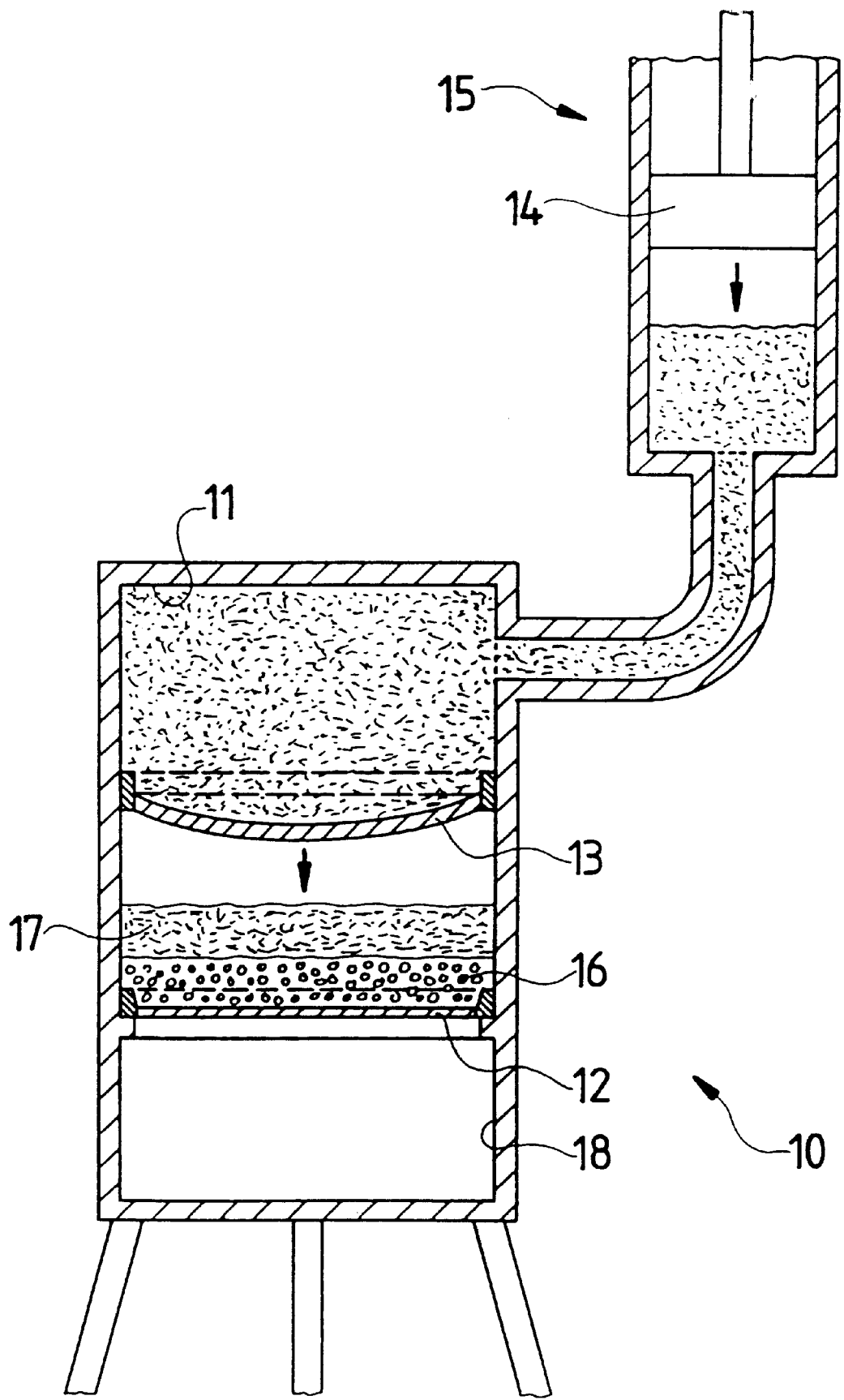

METHOD OF MANUFACTURING A DIETETIC, CHOLESTEROL-REDUCED WHOLE EGG OR EGG YOLK PRODUCT

This application has been filed under 35 USC 371 as a national stage application of PCT/EP96/01192 filed Mar. 20, 1996.

The method relates to a method of manufacturing a cholesterol-reduced, dietetic whole egg or egg yolk product. The invention is further directed to a cholesterol-enriched mixture, which is produced as a byproduct in this method, and to the use thereof in the manufacture of, in particular, medicinal or technical products.

A method of this generic type for manufacturing a dietetic, cholesterol-reduced whole egg or egg yolk product is disclosed in WO 93/14649. In the known method, the egg starting product is firstly dried and the dried egg substance is then extracted with a treatment agent based on a vegetable food oil. For the purpose of the extraction, the egg substance is suspended in the treatment medium, the suspension left to stand for a defined reaction period and then the volume of the treatment agent used is removed from the suspension in a de-oiling step. During the reaction period the lipid fraction of the egg starting product distributes itself uniformly in the treatment agent which is also lipophilic. The treatment agent removed in the de-oiling step thus contains a significant proportion of the lipid components of the egg starting product, amongst which in particular is the egg yolk cholesterol. If the extraction step is repeated a number of times, the lipid fraction of the egg starting product can be replaced completely by the e.g. vegetable food oil used as the treatment agent. A guaranteed cholesterol-reduced product is thus produced which contains absolutely no components which are questionable as regards foodstuff regulations.

The known method requires a relatively large amount of treatment agent. In order to maintain the duration of the method within limits to some extent, it is also necessary that the de-oiling step be performed by means of centrifugation. A rapid removal of the treatment agent is indeed possible in this manner. On the other hand, centrifuges are extremely susceptible to trouble and are expensive to purchase and maintain.

It is thus the object of the invention to provide a method which makes the manufacture of a cholesterol-reduced, dietetic whole egg or egg yolk product possible with a minimum input of material and time.

In accordance therewith, it is provided that, as in the known method, the starting product is initially dried. In distinction to the known method, however, no suspension is now produced of the dried egg starting product and the liquid, cholesterol-reduced agent used for the treatment. The treatment agent is instead pressed through the dried egg starting product in a suitable apparatus under predetermined pressure and temperature conditions. The dried egg starting product can be provided in powder form or also in a form which is conveyable with dosing pumps. In the latter case, the liquid carrier medium can be any desired organic, even cholesterol-containing foodstuff since it can be removed from the egg starting product virtually without residue within the scope of the method in accordance with the invention.

In contrast to the method of the known type, the removal of the lipid fraction from the egg starting product is no longer effected by means of extraction but instead by displacement. The operation of the displacement is relatively simple to explain. By drying the egg starting product the oil present in the liquid egg is broken into a water emulsion in a gentle manner. An egg powder is thus produced with grains which have a solid core of dried protein, which is surrounded externally by a lipid shell. The lipid shell is produced by virtue of the fact that the lipophilic components of the starting egg product are pressed against the surface of the grains by the shrinking process connected with the drying. The lipid shell, which initially comprises the lipid fraction of the egg starting product, can be displaced relatively easily from the protein core of the grains by the liquid treatment agent, which also contains lipids, and then replaced to the desired (adjustable) extent by a lipid shell based on the treatment agent.

The displacement of the lipid fraction of the egg starting product may be effected relatively well in suitable, transparent devices. Thus it is the case that the lipid fraction of the egg starting product has a yellowish, reddish hue due to the carrotenoids contained therein. If a colourless treatment agent is used for the displacement, the colour contrasting front region moving through the egg substance can be easily followed during the pressing process.

The method in accordance with the invention provides a whole range of advantages. An important advantage is that a significantly smaller amount of liquid, low-cholesterol treatment agent must be used in comparison to the method of the known type. In order to displace the lipid fraction out of the dried egg starting product, an amount of treatment agent is sufficient which approximately corresponds to the amount of the dried egg starting product. For maximum displacement, approximately twice the amount of treatment agent must be used. In contrast to this, the method of the known type requires an amount of treatment agent which is a multiple of that of the egg starting product.

A further advantage is that a high displacement rate of the egg lipid fraction may be achieved in the method in accordance with the invention in one working step. Depending on the control of the method, over 95% removal rate of the lipid contained in the egg starting product can be achieved and optionally replaced by the treatment agent. Over 95% of the cholesterol contained in the egg starting product can thus be removed in one working step. In the method of the known type a number of successive extraction steps are necessary to achieve this.

Finally, a further advantage is that the method in accordance with the invention requires only very low investment in plant. The provision of centrifuges is no longer necessary. The method can be performed advantageously in e.g. a filter press, the batch time being reduced to ca. ¼ in comparison to the method of the known type. In summary, the method in accordance with the invention operates with significantly reduced costs and with very high productivity.

Further advantages are that by predetermining the pressure and temperature conditions the lipid content of the egg product obtained after the treatment may be precisely adjusted. It is e.g. possible to adjust the cholesterol-reduced end product to the lipid content of the egg starting product. It is, however, also equally possible to adjust the lipid content in the cholesterol-reduced final product to a lower value by longer treatment periods (longer pressing).

A final advantage in this non-exhaustive listing resides in that optimum results are only achieved in the method of the known type if the egg starting product is dried to a defined grain size. Careful control of the e.g. spray drying process is therefore necessary. This requirement disappears in the method in accordance with the invention. In this case dried egg starting products with varying grain sizes or grain sizes which fluctuate from batch to batch, can be treated without difficulty. It is merely necessary to adapt the pressure or temperature conditions appropriately.

The FIGURE depicts the construction of a membrane filter press.

The method can theoretically be performed with every device in which a pressure- and temperature-controlled pressing of the treatment agent through the dried egg starting product is possible. Particularly suitable in this connection are filter presses in accordance with the invention in particular the membrane filter presses which will be described in more detail below. Typical membrane filter presses include a chamber, whose base is constructed as a filter. The dried egg starting product is disposed on this filter in a predetermined layer thickness and subsequently a layer of treatment medium is placed above it. The treatment medium is then pressed by means of a membrane, which is movably arranged in the chamber, into the layer of dried egg starting product, whereby the lipid fraction contained therein is displaced through the filter to the downstream side and discharges into a collecting vessel.

It is advantageously provided that the pressure with which the treatment medium is pressed into the dried egg starting product, does not exceed 50 bar. If the method in accordance with the invention is performed at pressures up to 50 bar, irreversible protein damage of the egg product may be reliably prevented. The setting of the suitable pressing pressure is primarily dependent on the grain size of the dried egg starting product. In the case of small grains (the dried egg starting product falls more finely and thus more densely), higher pressures must be used than with a coarser grain size. The optimum setting of the suitable pressing pressure in dependence on the grain size presents, however, absolutely no problem to the expert.

Suitable temperatures, at which the method can be optimally performed, lie in a range between 20° and 50° C. Damage of the proteins (e.g. by denaturing) may be reliably prevented in this temperature range.

In the method in accordance with the invention the original lipid fraction of the egg starting product is displaced and can be replaced wholly or partially by the treatment agent. It will be clear that a special character can be imparted to the end product produced by selection of the treatment agent. Thus it is e.g. possible to use vegetable food oils or a mixture of a number of vegetable food oils as the treatment agent. Vegetable food oils are particularly valuable from the dietetic point of view. It is particularly advantageous if a mixture of vegetable food oils is used, one of which is natural red palm oil. Red palm oil is an excellent antioxidant and ensures that the egg product produced in accordance with the invention is stable in storage and does not become prematurely rancid.

It is of course also possible to collect the lipid fraction displaced from the egg starting product, to remove the cholesterin contained with known methods and then to press it back again into the egg substance. An egg product is produced in this manner which has a composition identical to that of the egg starting product with the exception of the cholesterol content.

The final product produced can of course also be varied with respect to the lipid content. As stated above, it is possible to provide a final product with the lipid content of the starting product. It is, however, also possible to produce products with a lower lipid content by appropriate control of the method.

The invention does not relate only to a method of manufacturing cholesterolreduced whole egg or egg yolk products. It is in fact directed also to a mixture of egg lipids and treatment agent obtainable in the form of a filtrate in this method. At the beginning of the method the mixture almost exclusively contains the lipid fraction of the egg starting product which is then diluted increasingly by the treatment agent in the course of the further processing. If the mixture is collected in fractions, the fractions have a high cholesterol content at the beginning of the method which decreases as the method proceeds.

It has now transpired that a mixture with a cholesterol content above 1% can be used usefully in many ways. Thus the mixture which is obtained after the treatment comprising the lipid fraction of the egg starting product and the treatment agent which contain a cholesterol content of more than 1%, can be used in the pharmaceutical field, e.g. in the manufacture of steroids. They also have excellent properties as emulsifiers. Ecologically harmless lacquers, particularly acrylic resin lacquers, may also be produced on the basis of such a filtrate. The list is not exhaustive. The filtrates in accordance with the invention can basically be used in a wide variety of manners in the technical, pharmaceutical and foodstuff fields.

The method in accordance with the invention will be explained below in more detail with reference to an example and one FIGURE. The FIGURE is a purely schematic view of the construction of a membrane filter press which can be used in the method in accordance with the invention.

EXAMPLE 700 g egg yolk powder was placed dry in a membrane filter press which can e.g. have the construction shown in the figure discussed below. 1550 g washing oil at a temperature of 40° is placed in a layer above the egg yolk powder. This can be e.g. sunflower oil. The pressure is then increased to 5 bar for a period of time of 10 min. within the membrane filter and pressing at 15 bar is subsequently performed. The pressing duration amounts to a total of 15 min.

After the pressing process, an egg yolk cake is produced with a layer thickness of ca. 10 mm, the weight of which is 682 g. The lipid content is 62.5% both in the egg starting powder and also in the egg yolk cake which is produced. The cholesterol content, on the other hand, has decreased from 2.35% to 0.09%. The content of phytosterols has increased from 0% to 0.16% (which is due to the vegetable oil used for the treatment). The lecithin content remains unaltered at 18.5% in the egg starting product and in the egg yolk cake produced after the treatment. An egg yolk product is thus produced in one working step, which does not last longer than 20 min., whose cholesterin content has been significantly reduced. The method is so gentle that the lecithin content, which is important from the nutritional physiological point of view, is not impaired.

As stated above, the method in accordance with the invention is not only of interest with regard to the cholesterol-reduced egg product which may be produced thereby. The filtrate obtained in the method is in fact also of interest. In the described method, the filtrate was collected in three fractions. The first fraction weighed 499 g and had a total sterol content of 1.9% (of which cholesterol was 1.69% and phytosterol 0.16%). The second oil fraction weighed 422 g and had a total sterol content of 1.19% (of which cholesterol was 0.89% and phytosterol 0.20%). The third fraction weighed 606 g and had a total sterol content of 0.5% (of which cholesterol was 0.28% and phytosterol 0.22%). At least the first fraction can be used in the particularly advantageous manner described above for manufacturing a large number of technical and pharmaceutical products.

Finally, the figure will be discussed. This shows the construction of a membrane filter press 10 in a purely schematic manner. The press 10 includes a chamber 11, which is provided in its base region with a filter 12. Vertically movably disposed in the chamber 11 is a membrane 13 (which is moreover inherently elastic). The upper side of the membrane is in liquid communication with a piston 14 of a pump 15. If the piston 14 is moved downwardly in the direction of the arrow, the membrane 13 also moves in the chamber 11 in the direction of the arrow. Disposed on the filter 12 is any desired egg starting product 16, positioned above which in a layer is a defined amount of treatment agent 17. The treatment agent can be e.g. a mixture of vegetable food oils.

By lowering the piston 14 a pressure is produced in the chamber 11 below the membrane 13 which initially presses the treatment agent 17 into the egg starting product 16 and thus displaces its lipid fraction through the filter 12 into a collecting container 18. Devices for fractionated collection can be provided in the collecting container 18.

Such a membrane filter press is relatively economic to purchase and maintain. Furthermore, its operation requires virtually no prior technical knowledge.

I claim:

1. A method of manufacturing a dietetic, cholesterol-reduced whole egg or egg yolk product in which the whole egg or egg yolk constituting a starting product is dried and a lipid fraction is removed by treatment with a low-cholesterol, liquid treatment agent based on a lipid suitable for human nutrition and is at least partially replaced by the treatment agent, characterised in that the treatment agent is pressed through the dried whole egg or egg yolk under predetermined pressure and temperature conditions.

2. The method of claim 1, wherein a filter press is used to press the treatment agent through the dried whole egg or egg yolk.

3. The method of claim 1, wherein a pressure below 50 bar is selected.

4. The method of claim 1, wherein the temperature is set to a range between 20° and 50° C.

5. The method of claim 1, wherein a vegetable food oil or a mixture of vegetable food oils is used as the treatment agent.

6. The method of claim 5, wherein the mixture of vegetable food oils used as the treatment agent contains red palm oil.

7. The method of claim 1, wherein the lipid fraction of the whole egg or egg yolk used as the starting product is completely replaced by the treatment agent.

* * * * *